United States Patent Office 3,500,626
Patented Mar. 17, 1970

3,500,626
PROCESS FOR TREATMENT OF MOLECULARLY ORIENTED CRYSTALLINE ORGANIC POLYMERIC MATERIAL
Denis James Henry Sandiford, Welwyn, England, assignor to Imperial Chemical Industries Limited, Millbank, London, England, a corporation of Great Britain
Filed July 1, 1965, Ser. No. 468,875
Claims priority, application Great Britain, July 1, 1964, 27,198/64; Oct. 12, 1964, 41,612/64
Int. Cl. D02g 3/02
U.S. Cl. 57—140          23 Claims

ABSTRACT OF THE DISCLOSURE

A process which comprises fibrillating one or more ribbons each of which is of a crystalline organic polymeric material and each of which has been molecularly oriented longitudinally to cause incipient fibrillation, by twisting this material about its longitudinal axis under sufficient tension to cause transverse rupture of a proportion of the fibres forming the outer surface of the twisted material, thereby providing at least one broken fibre every one-thousandth of a square inch of the area consisting of the product of the length of the treated material multiplied by its average circumference.

---

Figure 1:
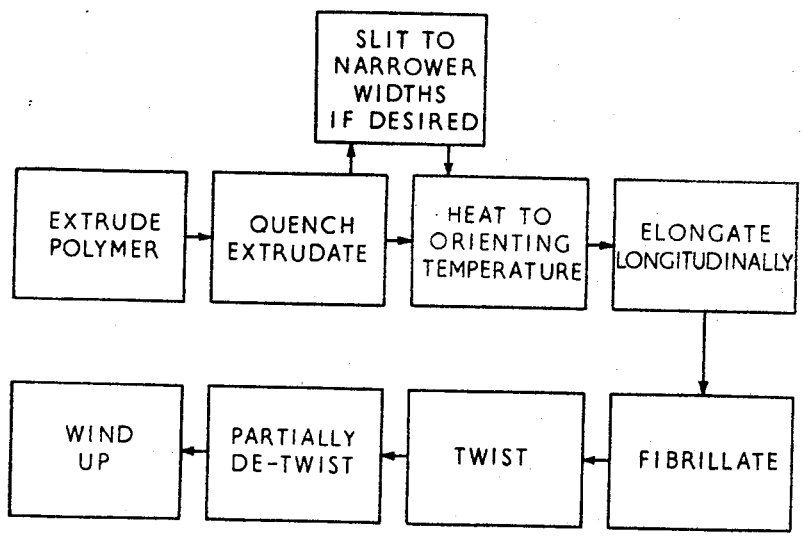

This invention relates to the treatment of molecularly oriented crystalline organic polymeric material. In particular, it relates to a process for converting such material into forms suitable for use in or as knitting or weaving yarn or rope or baler twine. In such articles, in addition to a high tenacity, it is desirable that they have a rough or hairy surface since this leads, in the case of fabrics, to good shape stability and, in the case of rope and twine, to good knot strength. It is the object of this invention to produce such materials in forms with such surfaces.

According to the present invention I provide a process which comprises fibrillating one or more ribbons each of which is of a crystalline organic polymeric material and each of which has been molecularly oriented longitudinally to cause incipient fibrillation, and twisting this material about its longitudinal axis under sufficient tension to cause transverse rupture of a proportion of the fibres forming the outer surface of the twisted material, thereby providing at least one broken fibre every one-thousandth of a square inch of the area consisting of the product of the length of the treated material multiplied by its average circumference.

Methods of fibrillating molecularly oriented crystalline organic polymeric materials are known and involve applying a mechanical shearing force to separate the oriented polymeric material into fibres, for example, by grating, turning, twisting or brushing. By "incipient fibrillation" I mean such material in a condition that it is readily separated nto fibres by such operations, and I include such material where partial separation has already occurred.

Very suitable organic polymeric materials which may be used in the process of this invention are polyethylene, polypropylene, poly-4-methyl pentene-1, polyoxymethylenes (including copolymers), polyvinyl fluoride, polyethylene terephthalate, polyamides such as polyhexamethylene adipamide and polyhexamethylene sebacamide and polycaprolactam and poly-3,3'-bischloromethyloxacyclobutane.

Ribbons of these polymeric materials are most readily obtained by melt extrusion. In order that the materials may be readily subjected to molecular orientation it is normally desirable to quench the materials immediately after extrusion. For ease of quenching it is desirable for the ribbons to have a narrow dimension and, in fact, very suitable ribbons are those in the form of a film.

Conditions for molecularly orienting crystalline organic polymeric materials differ from material to material as to such essential operating conditions as drawing temperature, the degree of draw and rate of draw. Conditions in such processes of molecular orientation favouring the production of material with incipient fibrillation are, firstly, the use of a high draw ratio whereby for instance the modulus in tension of the drawn material is at least three times the modulus of the unoriented polymer, secondly, the material being drawn should be drawn in equipment which allows contraction of the material in its transverse directions, e.g. equipment with widely spaced drawn rolls and, thirdly, that in the cross-section of the ribbon, the area and neither dimension should be unduly high or the central part tends not to draw to a state of incipient fibrillation. For example, the cross-sectional area may conveniently be less than 0.150 sq. inch before drawing, for best results less than 0.030 sq. inch. The ribbon may conveniently be in the form of a film or ribbon of thickness less than 0.030 inch and of width less than 4 inches, preferably less than 3 inches. A further suitable profile is in the form of tubular film extruded from an annular orifice where it is permissible to have a tube of diameter, before drawing, of up to 6 inches and of thickness less than 0.030 inch. In this embodiment the gas pressure inside the film should be so low that the stretching tube can contract radially. This does not conflict with my third condition above since in the case of a tubular profile there is much less mechanical restriction on the reduction in its circumference than in the case of a wide flat film and it is found that incipient fibrillation occurs over the whole circumference.

The desired ribbon may be obtained by melt extruding the material through an orifice of the appropriate dimensions or, alternatively, the material may be extruded through a relatively wide slit orifice and the resultant film separated longitudinally into a number of narrower films or monofils which are subjected to elongation. In the latter case the film may first be scored to a sufficient depth along a number of parallel lines so that it will be separated into narrower widths on application of the longitudinal stretching force, or alternatively the film may be cut through its entire thickness by suitable means and the already separated widths subjected to the longitudinal stretching forces. Each of these narrower ribbons may then be treated as hereinafter described to produce a twisted material or, alternatively, two or more of the narrower widths may be twisted together to produce a composite twisted material.

My preferred method for molecularly orienting a ribbon is to pass it from at least one contacting roller surface, rotating at a given speed, through a region in which the material is heated to a temperature at which it will draw uniformly but below its melting point, in the absence of any substantial lateral restraining forces, to at least one contacting roll surface rotating at an appropriately faster speed and spaced sufficiently far from the point where drawing first occurs to allow transverse contraction to occur. For example, the material may be passed around the surface of a heated "slow roll" through a hot air oven or past a source of radiant heat in the absence of any substantial lateral restraint against neck-down and on to and around a "fast roll" which may, if desired, be internally cooled, e.g. by circulating cold water through its hollow interior. When using a hot air oven the material being elongated preferably travels for a substantial distance, for instance of the order of several feet, therein out of contact with guide rolls in order to encourage transverse neck-down. In the other arrangement mentioned above, it is preferred that the material is heated up to the drawing temperature by infra-red heating means at a substantial distance from the "fast roll" and is thereafter elongated over substantially the whole of this distance.

In general, the temperatures at which molecular orientation of the polymeric materials subjected to longitudinal orientation occurs to to my invention will be below their crystalline melting points but above their second-order transition temperatures. By elongating the polymers mentioned above at such temperatures in the process of the present invention, they are obtained in the crystalline state.

The stretch ratios required for any particular polymer for obtaining the optimum increase in modulus can be readily determined by experiment. They depend on the characteristics of the polymer and the drawing temperature. For polypropylene an applied longitudinal stretch ratio of at least 5:1 is normally required, preferably at least 10:1.

The longitudinally oriented and fibrillated material may be twisted in one of the commercially available yarn or rope twisting machines. Normally the tension applied in the twisting operation of the present invention will not exceed about one quarter of the break strength of the material. A suitable tension is of the order of 1 gram per denier.

Since the degree of twist imparted under tension to the elongated article for causing the optimum amount of rupture in the surface fibers will frequently produce a twisted product that, on release of the tension, will curl up and be extremely difficult to handle and in particular to wind up, it is preferred to subject the twisted article to a de-twisting operation whereby part of the twist put into it is removed. For example, if three twists per inch have been put in, then one twist per inch may conveniently be removed thereafter in order to produce a handleable product.

Since one of the known methods of fibrillating is by twisting, one embodiment of my invention comprises twisting one or more ribbons each of which is of a crystalline organic polymeric material and each of which has been molecularly oriented longitudinally to cause incipient fibrillation, said twisting being about the longitudinal axis of the material and under sufficient tension to cause transverse rupture of a proportion of the fibers forming the outer surface of the twisted material thereby providing at least one broken fibre every one-thousandth of a square inch of the area consisting of a product of the length of the treated material multiplied by its average circumference.

By means of my invention twisted elongated materials which may be used as yarns, twines or ropes are obtained, or alternatively such articles may be produced by twisting one or more pieces of the twisted elongated material together so that a twisted article of the required dimensions is obtained. The yarns, twines or ropes produced have a high tenacity and a high knot strength. A particularly important feature of the twisted articles of my invention is their low twist recovery. As a consequence, they have high knot stability and very hard and stable twines and ropes can be produced without the use of a prolonged compacting operation which is often required with ropes and twines made from conventional rope and twine making materials in order to produce a stable article and which leads to a decrease in tenacity as compared with the uncompacted article.

Figure 2:
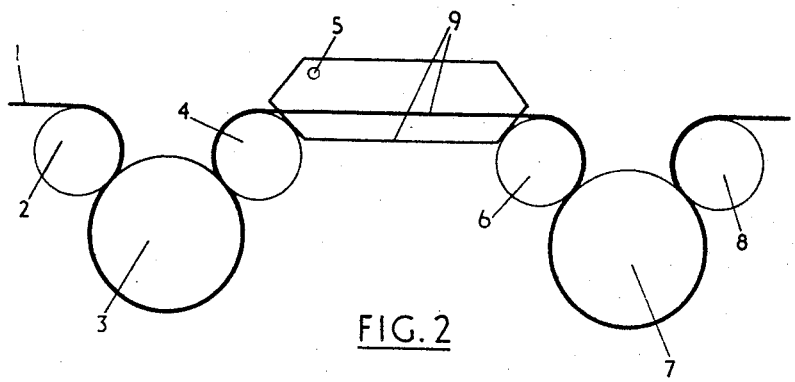
Figure 3:
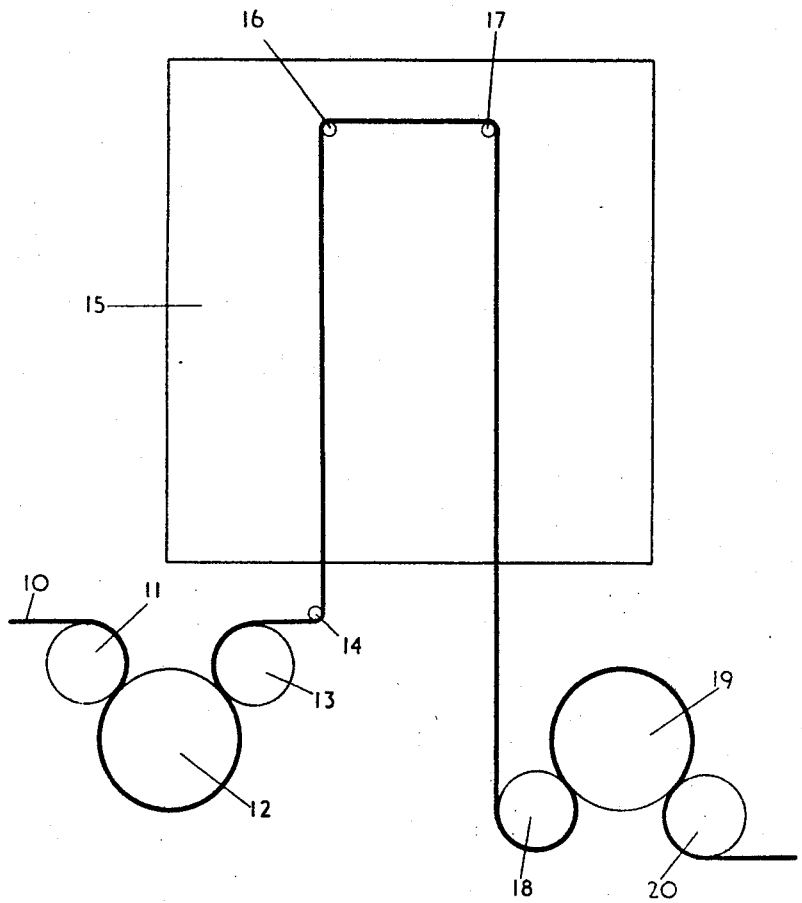

My invention is illustrated but in no way limited by the accompanying drawings. In the drawings:

FIGURE 1 accompanying this specification is a diagrammatic flowsheet indicating a series of steps which may be used in operating my process in a continuous manner; and FIGURES 2 and 3 each show in side elevation apparatus suitable for performing the elongating step in my multi-step process.

With reference to FIGURE 1, the polymer is extruded as a film which is then quenched, if desired slit into narrower widths, re-heated and elongated longitudinally at an appropriate temperature; the cooled material is fibrillated, twisted and then partially de-twisted and wound up on a reel.

FIGURE 2 shows the use of an infra-red heater in combination with a set of slow rolls and a set of fast rolls for performing the elongation step in my invention. Film 1 is passed through two nips formed by heated roller 3 with each of heated rollers 2 and 4, beneath infra-red heater 5 and through two nips formed by cooled rollers 6, 7 and 8. Roller 7 is driven faster than roller 3 such that the ratio of their angular velocities is equal to the stretch ratio imposed on the film. Heater 5 is focussed to heat the film over about one-third of its travel between roller 4 and roller 6 and the rate of cooling of the film over the remaining part of this distance is reduced by the provision of cowling 9.

FIGURE 3 shows an alternative arrangement for carrying out the elongating step of my invention. Film 10 is fed through the nips formed by heated rollers 11, 12 and 13, over guide roller 14 and upwards through hot air oven 15. Thence it changes direction and passes downwards via rollers 16 and 17 into the nips formed by cooled rollers 18, 19 and 20. Roller 19 is driven faster than roller 12 such that the ratio of their angular velocities is equal to the stretch ratio imposed on the film.

The invention is illustrated but in no way limited by the following examples.

EXAMPLE I

Polypropylene of initial melt flow index 28 (as measured at 190° C. using a 10 kg. weight) was extruded in the form of a film approximately 18 inches wide and 0.010 inch thick and slit to give three films of 5 inches width and two edge trims, the latter being removed. The films were fed at a rate of 24 ft. per minute to an apparatus such as that shown in FIGURE 2 where they were drawn between slow and fast rollers, the fast rollers rotating rotating at a speed 11 times greater than the slow rollers. The heating by the infra-red heaters was such that the actual drawing of the film took place over a length of about 6 inches, the dimensions of each film (originally 5 inches wide by 0.010 inch thick) being reduced to 1.6 inches wide by 0.003 inch thick after drawing. The material thus produced was twisted to an extent of 1 turn per inch using an applied tension of 3 kg. (⅛ g. per denier) to produce a twine of hairy appearance. The tenacity and twist retention of the twine as produced, and the tenacity of a knotted sample were measured with the results shown in Table I. For comparison similar measurements made on twines of the same denier produced from polypropylene staple fibre and from sisal are shown.

TABLE I

| Material | Tenacity of twine (g./denier) | Tenacity of knotted twine (g./denier) | Twist [1] Retention (percent) |
| --- | --- | --- | --- |
| Twine produced as in Example I | 4.2 | 3.0 | 86 |
| Twine from polypropylene staple fibre | 5.0 | 3.1 | 20 |
| Sisal twine | 1.8 | 1.3 | |

[1] Measurement of twist retention was accomplished as follows: A sample of twine was twisted to an extent of 3 turns per inch. The torque was removed, and after 1 minute the number of turns per inch was measured and expressed as a percentage of 3 turns.

EXAMPLE II

Polypropylene of initial melt flow index 50 was extruded as a film approximately 6 inches wide and 0.006 inch thick which after removing edge trims was slit into 16 narrower films each of 0.3 inch wide. The films were then drawn to 9 times their original length over a distance of 4 inches using the apparatus of FIGURE 2 to produce a material of 1,000 denier, 0.1 inch wide and 0.002 inch thick.

Twisted yarn produced from this material had a tenacity of 7 g. per denier.

EXAMPLES III–XII

Using the procedure of Example I, the effect of draw ratios of from 5:1 to 12:1 were applied and the tenacity of the twisted twines produced in each case was measured with the results shown in Table II.

TABLE II

| Example No. | Draw ratio | Tenacity (g./denier) |
| --- | --- | --- |
| III | 5:1 | 1.7 |
| IV | 6:1 | 2.5 |
| V | 7:1 | 3.4 |
| VI | 8:1 | 4.0 |
| VII | 9:1 | 4.1 |
| VIII | 10:1 | 4.3 |
| IX | 10.5:1 | 5.2 |
| X | 11:1 | 4.3 |
| XI | 11.5:1 | 4.7 |
| XII | 12:1 | 4.6 |

EXAMPLE XIII

A polypropylene tube was extruded of diameter 2.38 inches and wall thickness 0.010 inch. The tube was passed centrally through a heating zone consisting of a symmetrically disposed annular arrangement of infra-red heaters which uniformly heated it over a distance of about 12 inches while it was drawn longitudinally to 10 times its length, between two pairs of nip rolls. The drawn film was slit and opened out to a flat shape which was then twisted together to form a hairy twine of high tenacity and twist retention.

EXAMPLE XIV

A 0.010 inch thick film of polyoxymethylene polymer was extruded, slit to 5 inch widths and drawn without sideways restraint at a draw ratio of 8:1. The product was fibrillated by twisting to produce a hairy twine of tenacity 8 g. per denier.

I claim:

1. A process which comprises fibrillating one or more ribbons, each of which is of a crystalline organic polymeric material and each of which has been molecularly oriented longitudinally to cause incipient fibrillation, by twisting this material about its longitudinal axis under a tenson not greater than quarter the break strength of the material which is sufficient to cause transverse rupture of a proportion of the fibers forming the outer surface of the twisted material, thereby providing at least one broken fiber every one-thousandth of a square inch of the area consisting of the product of the length of the treated material multiplied by its average circumference.

2. A process according to claim 1 in which said crystalline organic material is a polyolefine.

3. A process according to claim 2 in which said polyolefine is polyethylene.

4. A process according to claim 2 in which said polyolefine is polypropylene.

5. A process according to claim 1 in which said crystalline organic material is polyethylene terephthalate.

6. A process which comprises longitudinally molecularly orienting a ribbon of a crystalline organic polymeric material to cause incipient fibrillation utilising a high draw ration and allowing transverse contraction of said ribbon and fibrillating said ribbon by twisting about its longitudinal axis under sufficient tension to cause transverse rupture of a proportion of the fibres forming the outer surface of the twisted material, thereby providing at least one broken fibre every one-thousandth of a square inch of the area consisting of the product of the length of the treated material multiplied by its average circumference.

7. A process according to claim 6 in which said ribbon is passed from at least one contacting roller surface, rotating at a given speed, through a region in which the material is heated to a temperature at which it will draw uniformly but below its melting point, in the absence of any substantial lateral restraining forces, to at least one contacting roll surface rotating at an appropriately faster speed and spaced sufficiently far from the point where drawing first occurs to allow transverse contraction to occur.

8. A process according to claim 6 in which said ribbon is passed from at least one contacting roller surface, rotating at a given speed, through a region in which the material is heated to a temperature at which it will draw uniformly but below its melting point, in the absence of any substantial lateral restraining forces, to at least one contacting roll surface rotating at least 5 times faster and spaced sufficiently far from the point where drawing first occurs to allow transverse contraction to occur.

9. A process according to claim 6 in which said ribbon is passed from at least one contacting roller surface, rotating at a given speed, through a region in which the material is heated to a temperature at which it will draw uniformly but below its melting point, in the absence of any substantial lateral restraining forces, to at least one contacting roll surface rotating at least 10 times faster and spaced sufficiently far from the point where drawing first occurs to allow transverse contraction to occur.

10. A process according to claim 6 in which said ribbon has a cross-sectional area less than 0.150 square inch.

11. A process according to claim 10 in which said ribbon is in the form of a film of thickness less than 0.030 inch.

12. A process according to claim 10 in which said ribbon is in the form of a film of width less than 4 inches.

13. A process according to claim 6 in which said ribbon has a cross-sectional area less than 0.030 square inch.

14. A process according to claim 6 in which said ribbon is in the form of a tubular film of diameter less than 6 inches and wall thickness less than 0.030 inch.

15. A process according to claim 6 in which said ribbon is obtained by the longitudinal separation of a wide film.

16. A process according to claim 1 in which said material is twisted about its longitudinal axis under a tension of not greater than one quarter of the break strength of said material.

17. A process according to claim 16 in which said tension is less than 1 g. per denier.

18. A process according to claim 17 in which said pieces of twisted material are further twisted together about the same longitudinal axis.

19. A process according to claim 1 in which the or all of the said fibrillated ribbons are twisted together about the same longitudinal aixs.

20. A process according to claim 1 in which the said fibrillated ribbon or ribbons are twisted about two or more longitudinal axes to form two or more pieces of twisted material.

21. Twisted elongated materials produced according to the process of claim 1.

22. Twisted elongated materials according to claim 21 having a twist retention greater than 60%.

23. Twisted elongated materials according to claim 21 in which said twist retention is greater than 80%.

References Cited

UNITED STATES PATENTS

| | | |
|---|---|---|
| 2,920,349 | 1/1960 | White. |
| 3,165,563 | 1/1965 | Rasmussen. |
| 3,212,251 | 10/1965 | Linke et al. |
| 2,336,100 | 12/1943 | Jacque _____ 57—167 |
| 2,700,657 | 1/1955 | Look et al. _____ 28—1.4 |
| 2,707,805 | 5/1955 | Smith et al. _____ 28—1.4 |
| 2,918,784 | 12/1959 | Faircloth _____ 57—167 |
| 2,980,982 | 4/1961 | Costa et al. _____ 28—1.4 |
| 3,177,557 | 4/1965 | White _____ 57—34 X |
| 3,214,899 | 11/1965 | Wininger et al. _____ 57—140 |
| 3,293,844 | 12/1966 | Wininger et al. _____ 57—157 |

JOHN PETRAKES, Primary Examiner

U.S. Cl. X.R.

28—72; 57—155, 157, 167